United States Patent
Wang et al.

(10) Patent No.: US 11,889,356 B2
(45) Date of Patent: Jan. 30, 2024

(54) METHOD AND A DEVICE FOR DATA RETRANSMISSION

(71) Applicant: Samsung Electronics Co., Ltd., Suwon-si (KR)

(72) Inventors: Weiwei Wang, Beijing (CN); Lixiang Xu, Beijing (CN); Hong Wang, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 3 days.

(21) Appl. No.: 17/261,437

(22) PCT Filed: Aug. 9, 2019

(86) PCT No.: PCT/KR2019/010121
§ 371 (c)(1),
(2) Date: Jan. 19, 2021

(87) PCT Pub. No.: WO2020/032718
PCT Pub. Date: Feb. 13, 2020

(65) Prior Publication Data
US 2021/0184994 A1 Jun. 17, 2021

(30) Foreign Application Priority Data

Aug. 9, 2018 (CN) .................. 201810908378.X
Feb. 14, 2019 (CN) .................. 201910116831.8

(51) Int. Cl.
*H04W 28/14* (2009.01)
*H04L 1/08* (2006.01)
(Continued)

(52) U.S. Cl.
CPC .............. *H04W 28/14* (2013.01); *H04L 1/08* (2013.01); *H04L 47/30* (2013.01); *H04L 49/9005* (2013.01); *H04W 72/21* (2023.01)

(58) Field of Classification Search
None
See application file for complete search history.

(56) References Cited

U.S. PATENT DOCUMENTS

| 2006/0133278 A1 | 6/2006 | Hill et al. |
| 2008/0062911 A1 | 3/2008 | Choi et al. |

(Continued)

FOREIGN PATENT DOCUMENTS

| CN | 1801687 A | 7/2006 |
| CN | 101931517 A | 12/2010 |

(Continued)

OTHER PUBLICATIONS

3GPP TS 38.470 V15.2.0. F1 general aspects and principles, Release 15. (Jun. 2018) (Year: 2018).*

(Continued)

*Primary Examiner* — Andre Tacdiran
(74) *Attorney, Agent, or Firm* — Jefferson IP Law, LLP

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. There is provided a method for data retransmission, comprising: receiving, by a second node, a first message that is transmitted by a first node and comprises information related to a data packet; determining, by the second node, a data packet to be retransmitted according to the first message; and retransmitting the packet to be retransmitted.

9 Claims, 10 Drawing Sheets

(51) Int. Cl.
  *H04L 47/30* (2022.01)
  *H04L 49/9005* (2022.01)
  *H04W 72/21* (2023.01)

(56) References Cited

U.S. PATENT DOCUMENTS

| | | | |
|---|---|---|---|
| 2008/0175186 A1 | 7/2008 | Liu et al. | |
| 2009/0067364 A1 | 3/2009 | Chang et al. | |
| 2009/0327830 A1 | 12/2009 | Lee et al. | |
| 2010/0165846 A1 | 7/2010 | Yamaguchi et al. | |
| 2011/0199927 A1 | 8/2011 | Frost et al. | |
| 2012/0276897 A1* | 11/2012 | Kwon | H04B 1/1027 455/501 |
| 2013/0039180 A1* | 2/2013 | Hong | H04W 8/22 370/231 |
| 2013/0090055 A1 | 4/2013 | Pitakdumrongkija et al. | |
| 2013/0210471 A1* | 8/2013 | Lessard | H04W 4/12 455/466 |
| 2014/0169370 A1* | 6/2014 | Filsfils | H04L 45/26 370/392 |
| 2015/0009823 A1* | 1/2015 | Ganga | H04L 47/2441 370/235 |
| 2015/0029913 A1* | 1/2015 | Zhou | H04W 80/00 370/281 |
| 2015/0103668 A1* | 4/2015 | Tian | H04L 47/30 370/236 |
| 2015/0133122 A1* | 5/2015 | Chen | H04W 76/15 455/436 |
| 2015/0230082 A1* | 8/2015 | Li | H04W 8/24 370/252 |
| 2016/0308764 A1 | 10/2016 | Le et al. | |
| 2016/0338068 A1* | 11/2016 | Cheng | H04W 28/0958 |
| 2018/0027474 A1 | 1/2018 | Wang et al. | |
| 2019/0090208 A1 | 3/2019 | Seo et al. | |
| 2019/0190662 A1 | 6/2019 | Lee et al. | |
| 2019/0223078 A1* | 7/2019 | Sirotkin | H04B 7/2606 |
| 2019/0335364 A1 | 10/2019 | Liu et al. | |
| 2019/0349834 A1* | 11/2019 | Teyeb | H04W 84/18 |
| 2019/0350023 A1* | 11/2019 | Novlan | H04L 5/16 |
| 2020/0008218 A1* | 1/2020 | Shih | H04W 72/21 |
| 2020/0037200 A1* | 1/2020 | Cho | H04W 80/02 |
| 2020/0107342 A1* | 4/2020 | Kuang | H04W 72/1263 |
| 2021/0007118 A1* | 1/2021 | Liu | H04W 72/1263 |
| 2021/0105700 A1* | 4/2021 | Lu | H04W 40/22 |
| 2021/0159968 A1* | 5/2021 | Fujishiro | H04L 1/16 |
| 2021/0219183 A1* | 7/2021 | Huang | H04W 28/0278 |

FOREIGN PATENT DOCUMENTS

| | | | | |
|---|---|---|---|---|
| CN | 102685780 | A | | 9/2012 |
| CN | 103647722 | A | | 3/2014 |
| CN | 104270324 | A | | 1/2015 |
| CN | 201810150653.6 | A | * | 2/2018 |
| CN | 108282825 | A | | 7/2018 |
| CN | 110149674 | A | * | 8/2019 ........ H04W 72/1284 |
| CN | 110636555 | | * | 12/2019 |
| JP | 2003-304273 | A | | 10/2003 |
| KR | 10-2010-0002111 | A | | 1/2010 |
| KR | 20110120828 | A | * | 11/2011 ............ H04W 74/00 |
| KR | 20180022699 | A | * | 3/2018 ............ H04W 28/10 |
| WO | 2017/155321 | A1 | | 9/2017 |
| WO | 2017/196085 | A2 | | 11/2017 |

OTHER PUBLICATIONS

Huawei et al., R2-1806126, Adaptation layer based L2 relaying and light L2 relaying, 3GPP TSG RAN WG2 #101bis, 3GPP, Apr. 16, 2018 pp. 1-9, See pp. 2-4 (Year: 2018).*

AT&T et al., R2-1810382, Lossless Data Transfer for IAB Design with Hop-by-Hop RLC ARQ, 3GPP TSG RAN WG2 #AHS, 3GPP, Jun. 22, 2018 pp. 1-5, See pp. 1-5 (Year: 2018).*

Ericsson; Layer 2 Functions for Multi-hop IAB System; 3GPP TSG-RAN WG2 #102; R2-1806814; May 21-25, 2018; May 11, 2018; Busan, Republic of Korea.

Chinese Office Action with English translation dated Jan. 20, 2023; Chinese Appln. No. 201910116831.8.

European Search Report dated Mar. 20, 2023; European Appln. No. 19 847 789.5-1215.

European Search Report dated Aug. 13, 2021; European Appln. No. 19847789.5-1215 / 3811540 PCT/KR2019010121.

* cited by examiner

METHOD AND A DEVICE FOR DATA RETRANSMISSION

TECHNICAL FIELD

The present application relates to a wireless communication technology, and more particularly to a method and a device for data retransmission in a multi-hop network.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Meanwhile, an IAB (Integrated Access and Backhaul) topic is proposed to build a multi-hop network architecture have been recently researched in order to extend coverage of the network.

DISCLOSURE OF INVENTION

Technical Problem

When the path used by the user to communicate with the anchor node changes (from an old path to a new path), the new path will contain some relay nodes of the old path that serves the user, the packets received by these relay nodes and not transmitted to the user are not needed to be retransmitted by the anchor node. Therefore, based on the characteristics of the multi-hop network, when the path of communication between the user and the anchor node changes, it may be considered to design a related mechanism to reduce unnecessary retransmission of the data packet.

Solution to Problem

The disclosure helps the anchor node to obtain the data packet information to be retransmitted through the information interaction between the nodes.

According to an aspect of the present disclosure, there is provided a method for data retransmission, comprising: receiving, by a second node, a first message that is transmitted by a first node and comprises information related to a data packet, wherein the information related to the data packet comprises the information related to at least one of a data packet to be retransmitted, a data packet to be not retransmitted, a cached data packet, an un-cached data packet at the first node, a data packet successfully transmitted to a user, a data packet unsuccessfully transmitted to the user, a data packet successfully transmitted to the next hop node, a data packet unsuccessfully transmitted to the next hop node, a lost data packet, and an un-lost data packet; determining, by the second node, a data packet to be retransmitted; and retransmitting the data packet to be retransmitted.

In an embodiment, receiving, by the second node, the first message that is transmitted by the first node may comprise: receiving, by the second node, the first message from the first node that is sequentially forwarded by one or more nodes.

In an embodiment, the first message received by the second node may comprise information modified by the one or more nodes.

In an embodiment, the second node receives the first message transmitted according to one of the following transmission formats: being included in a packet header of a data packet of the RLC layer, being included in a newly defined data packet type of RLC layer, being included in a data packet or a packet header of the data packet of a newly defined protocol layer, being included in a packet header of the data packet of the MAC layer, being included in the downlink data delivery status defined by the user plane of the F1 interface, and being included in a message of the control plane.

In an embodiment, the first message may further include at least one of identification information of a node where the data packet is located, an identification of a user to which the data packet belongs, and an identification of a bearer to which the data packet belongs, an identification indicating the user and the bearer to which the data packet belongs, indication information indicating a type of the data packet to which the information related to the data packet is referring, an indication of radio link outage/resume, an indication of an uplink or downlink radio link outage/resume, identification information of a link in which the radio link outage/resume occurs, indication information indicating that the node stops data transmission, size information of an available cache, desired transmission data rate information of the node, policy information of caching data at the node, identification information of a destination node, indication information indicating that the node reports the information related to the data packet, indication information indicating a type of the data packet to which the information related to the data packet transmitted by the node is referring, identification information indicating other nodes that need to report the information related to the data packet, identification information indicating a destination node that receives the information related to the data packet, identification information indicating the next hop node, information indicating whether the node continues to serve, an identification indicating a node that continues to serve, an identification indicating a node that no longer serves, information indicating whether a previous hop node needs to update the received above information related to the data packet transmitted from the other nodes, and information indicating that a trigger condition for transmitting the information related to the data packet is that the path of the radio link has changed.

According to another aspect of the present disclosure, there is also provided a method for data retransmission, comprising: acquiring, by a first node, information related to a data packet; and transmitting, by the first node, a first message comprising the information related to the data packet to a second node, wherein the information related to the data packet comprises the information related to at least one of a data packet to be retransmitted, a data packet to be not retransmitted, a cached data packet, an un-cached data packet, a data packet successfully transmitted to a user, a data packet unsuccessfully transmitted to the user, a data packet successfully transmitted to the next hop node, a data packet unsuccessfully transmitted to the next hop node, a lost data packet, and an un-lost data packet.

In an embodiment, before transmitting, by the first node, the first message comprising the information related to the data packet to the second node, the method may further comprise: receiving, by the first node, from a third node a second message for configuring the first node, wherein the second message comprises at least one of indication information indicating that the first node reports the information related to the data packet, identification information indicating other nodes that need to report the information related to the data packet, identification information indicating a destination node that receives the information related to the data packet, identification information indicating a node that directly receives the information related to the data packet transmitted by the first node, indication information indicating that the first node stops data transmission, configuration information of configuring the policy of caching data at the first node, indication information indicating the policy of caching data at other nodes, information indicating whether the first node continues to serve, indication information indicating an identification of a node that continues to serve, indication information indicating an identification of a node that no longer serves the user, and indication information indicating whether the first node needs to update the received information related to the data packet transmitted from other nodes.

In an embodiment, acquiring, by the first node, the information related to the data packet may comprise at least one of the following: acquiring, by the first node, local information related to the data packet; and acquiring, by the first node, the information related to the data packet from a fourth node.

In an embodiment, after acquiring, by the first node, the information related to the data packet, the method may further comprise: determining a data packet to be retransmitted according to the acquired information related to the data packet; and transmitting information of the data packet to be retransmitted to the second node.

According to still another aspect of the present disclosure, there is provided a device for data retransmission, comprising: a receiving unit configured to receive a first message that is transmitted by a first node and comprises information related to a data packet, wherein the information related to the data packet comprises the information related to at least one of a data packet to be retransmitted, a data packet to be not retransmitted, a cached data packet at the first node, an un-cached data packet at the first node, a data packet successfully transmitted to a user, a data packet unsuccessfully transmitted to the user, a data packet successfully transmitted to the next hop node of the first node, a data packet unsuccessfully transmitted to the next hop node of the first node, a lost data packet, and an un-lost data packet; a determining unit configured to determine a data packet to be retransmitted; and a retransmission unit configured to retransmit the data packet to be retransmitted.

According to still another aspect of the present disclosure, there is provided a device for data retransmission, comprising: an acquiring unit configured to acquire information related to a data packet; and a transmitting unit configured to transmit a first message that comprises the information related to the data packet, wherein the information related to the data packet comprises the information related to at least one of a data packet to be retransmitted, a data packet to be not retransmitted, a cached data packet at the first node, an un-cached data packet at the first node, a data packet successfully transmitted to a user, a data packet unsuccessfully transmitted to the user, a data packet successfully transmitted to the next hop node of the first node, a data packet unsuccessfully transmitted to the next hop node of the first node, a lost data packet, and an un-lost data packet.

According to still another aspect of the present disclosure, there is provided a method for retransmitting data in a multi-hop network, comprising: transmitting a message including information related to a data packet along a radio link, wherein a node in the radio link forwards the received message or updates the message based on the node's own condition and transmits it to the next hop node in the radio link, wherein the information related to the data packet includes identification information of the data packet for retransmitting the data.

In an embodiment, after transmitting the message to an anchor node, the anchor node transmits a data packet to be retransmitted.

According to still another aspect of the present disclosure, there is provided a method for retransmitting data in a multi-hop network, comprising: receiving, from a previous hop node, a message including information related to a data packet, wherein the information related to the data packet includes identification information of the data packet for retransmitting the data; and forwarding the message or updating the message based on the current node's own condition and transmitting it to the next hop node.

In an embodiment, the method may further comprise transmitting the message to an anchor node so that the anchor node transmits a data packet to be retransmitted.

The present disclosure also provides a corresponding network node and a computer readable storage media.

Advantageous Effects of Invention

The disclosure has the advantages that through the interaction of the information related to the data packet between the nodes, it is helpful for the anchor node to know the data packet to be retransmitted by the anchor node when the path of the communication between the user and the anchor node changes, thereby avoiding those data packets that have been cached in the node of the new path from being retransmitted by the anchor node again.

BRIEF DESCRIPTION OF DRAWINGS

The above and other objects and features will be apparent from the following description with reference to the accompanying drawings, wherein the similar reference numerals refer to the similar components, unless otherwise indicated, and in the figures.

MODE FOR THE INVENTION

The user involved in the present disclosure may be a terminal device or a relay node, since the relay node can communicate with other nodes as a user.

The next hop node of one node involved in the present disclosure is a node directly receiving the data transmitted by the one node. Further, if in the uplink, a node 1 transmits data in the direction towards the anchor node, the next hop node of the node 1 is an upper-level node of the node 1 (a node closer to the anchor node than the node 1). If in the downlink, a node 1 transmits data in the direction towards the user, the next hop node of the node 1 is a lower-level node of the node 1 (a node closer to the user than the node 1).

The user involved in the present disclosure may be a relay node or an end user.

In the existing mechanism, when a user performs handover from one base station (source base station) to another base station (target base station), data that has been received by the source base station but not correctly transmitted to the user need to be transmitted to the target base station, and need to be retransmitted by the target base station. In another case, when the user performs handover from one distributed unit (source distributed unit) of the base station to another distributed unit (target distributed unit) of the same base station, the central unit needs to transmit data that has not been transmitted to the user to the target distributed unit, and then the target distributed unit transmits the data to the user. According to the prior art, in an IAB network, when a user performs handover, some or all of the relay nodes on the path between the anchor node and the user may change, and the anchor node needs to retransmit the packet that is not correctly received by the user, i.e., the anchor node needs to retransmit the data that has been transmitted to the original path but has not yet been transmitted to the user.

However, the prior art design does not consider a multi-hop network.

Figure 1:
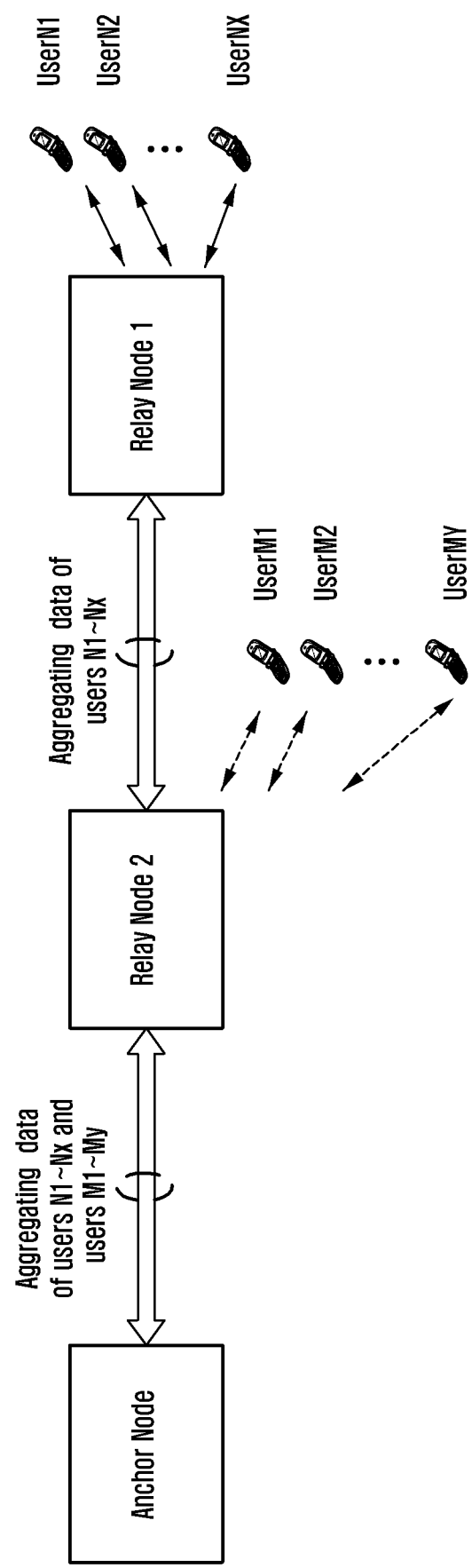
FIG. 1 illustrates a multi-hop network architecture according to an embodiment of the present disclosure.
Figure 2:
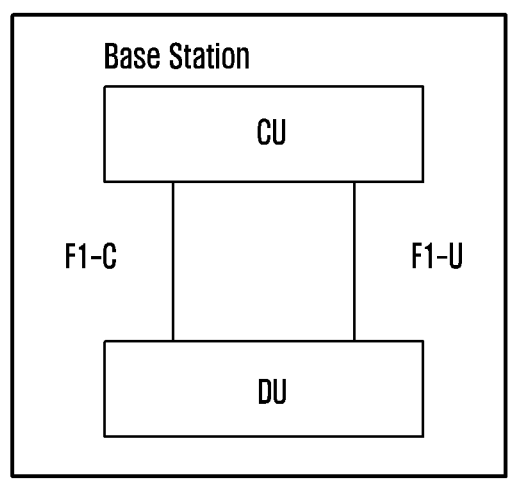
FIG. 2 illustrates a block diagram of a base station including a central unit and a distributed unit, according to an embodiment of the present disclosure.

The main purpose of the topic is to build a multi-hop network architecture, as shown in the FIG. 1. The figure shows a network architecture comprising an anchor node (donor node) and two relay nodes, all users ultimately communicating with the anchor node. In this architecture, the relay nodes may be in charge of aggregation and separation of user data. If the users N1~Nx and the users M1~My transmit data to the anchor node (Donor Node), the users N1~Nx perform data transmission through the relay node 1, and then between the relay node 1 and the relay node 2, the data of the users N1~Nx may be aggregated into data that are transmitted from the relay node 1 to the relay node 2; the users M1~My perform data transmission through the relay node 2, and then between the relay node 2 and the anchor node, the data of the users M1~My and the data from the relay node 1 (i.e., the aggregated data of the users N1~Nx) may be aggregated into data that are transmitted from the relay node 2 to the anchor node. If the anchor node transmits data to the users N1~Nx and the users M1~My, the anchor node transmits the aggregated data of the users N1~Nx and the users M1~My to the relay node 2, and the relay node 2 needs to distinguish, from the aggregated data, which are the data transmitted to the users M1~My and which are the data transmitted to the relay node 1, and transmits the data to these users and the relay node 1, respectively. After receiving the data from the relay node 2, the relay node 1 needs to distinguish the data transmitted to the users N1~Nx and transmits the data to the corresponding users respectively. In this architecture, the anchor node may be a base station (the base station may be a complete base station, may also be a base station composed of a central unit and a distributed unit, the central unit and the distributed unit are in communication with each other via a F1 interface), and may also be a central unit (CU) of the base station. The relay node may be a base station (the base station may be a complete base station, may also be a base station composed of a central unit and a distributed unit, the central unit and the distributed unit are in communication with each other via a F1 interface) and may also be a distributed unit (DU) of the base station, and the relay node may also comprise a function module required for the user to communicate with other nodes (such as other base stations and other relay nodes). The central unit and the distributed unit of the base station above are shown in FIG. 2. The CU has at least a Radio Resource Control (RRC) and Packet Data Convergence Protocol (PDCP) protocol layers and so on, and may also include a Service Data Adaptation Protocol (SDAP). The DU has a Radio Link Control Protocol (RLC), a Medium Access Control (MAC), and a physical layer and so on. A standardized public interface F1 is between the CU and the DU. The F1 interface is classified into a control plane F1-C and a user plane F1-U. A transport network layer of the F1-C is transported based on IP. For more reliable transport signaling, a SCTP protocol is added over the IP. The protocol of the application layer is F1AP. The SCTP can provide reliable transmission of application layer message. The transport layer of the F1-U is UDP/IP, and GTP-U is used to carry a User Plane Protocol Data Unit (PDU) over the UDP/IP.

The first aspect of the disclosure is as follows.

Figure 3:
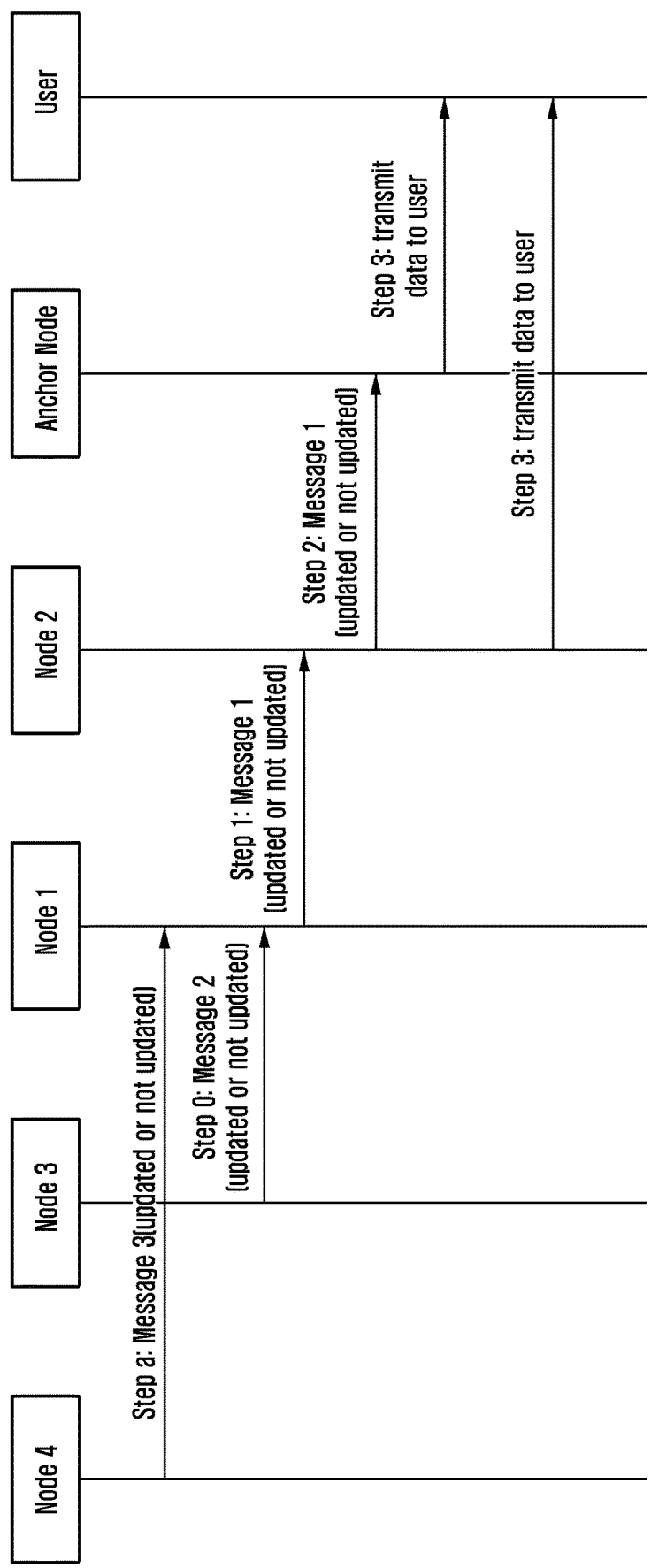
FIG. 3 illustrates a signaling flow diagram between nodes according to an embodiment of the present disclosure.

As shown in FIG. 3, the process involved in the present disclosure includes:

Step 1: In the IAB network, a node 1 transmits a message 1 to a node 2. The node 1 and the node 2 may both be relay nodes, or the node 1 is a relay node and the node 2 is an anchor node (the anchor node is a base station, or a distributed unit of the base station, or a central unit of the base station), or the node 1 is a distributed unit of the base station and the node 2 is a central unit of the base station, or the node 1 is a central unit of the base station and the node 2 is a distributed unit of the base station, or the node 1 is a central unit of the anchor node and the node 2 is a relay node. The message 1 includes at least one of the following information:

Information related to the data packet which may be PDCP PDU or in other formats (such as RLC PDU, MAC PDU, etc.). The information related to the data packet is referring to one or more data packets, which may be a data packet to be retransmitted, may also be a cached data packet, may also be a lost data packet, may also be a data packet successfully transmitted to the user, may also be a data packet successfully transmitted to the next hop node of the node 1, may also be a data packet to be not retransmitted, may also be an un-cached data packet, may also be an un-lost data packet, may also be the data packet unsuccessfully transmitted to the user, or may also be the data packet unsuccessfully transmitted to the next hop node of the node 1, and includes at least one of the following information:

Identification information of the data packet, which may be acquired by the node 1 through its judgment according to its own situation, may also be acquired by the node 1 according to related information transmitted by other nodes (such as information of a data packet transmitted by other nodes), or may also be acquired by the node 1 through its own situation and the related information transmitted by other nodes (such as information of the data packet to be retransmitted which is transmitted by other nodes). The identification information of the data packet may have the following possible expression forms (the following forms are just examples):

Form 1: minimum identification of the data packet+maximum identification of the data packet Form 2: minimum identification of the data packet+bitmap (each bit in the bitmap corresponds to one data packet, if the above information related to the data packet is referring to the data packet to be retransmitted/the data packet to be not retransmitted, the value of each bit indicates whether the data packet represented by the bit needs to be retransmitted; if the above information related to the data packet is for the cached data packet/the un-cached data packet, the value of each bit indicates whether the data packet represented by the bit is present in the cache; if the above information related to the data packet is referring to the lost data packet/the un-lost data packet, the value of each bit indicates whether the data packet represented by the bit is lost; if the above information related to the data packet is referring to the data packet successfully transmitted to the user/the data packet unsuccessfully transmitted to the user, the value of each bit indicates whether the data packet represented by the bit is successfully transmitted to the user; if the above information related to the data packet is referring to the data packet successfully transmitted to the next hop node of the node 1/the data packet unsuccessfully transmitted to the next hop node of the node 1, the value of each bit indicates whether the data packet represented by the bit is successfully transmitted to the next hop node of node 1)

Form 3: minimum identification of the data packet+the number of the data packets Form 4: maximum identification of the data packet+bitmap (each bit in the bitmap corresponds to one data packet, if the above information related to the data packet is referring to the data packet to be retransmitted/the data packet to be not retransmitted, the value of each bit indicates whether the data packet represented by the bit needs to be retransmitted; if the above information related to the data packet is referring to the cached data packet/the un-cached data packet, the value of each bit indicates whether the data packet represented by the bit is present in the cache; if the above information related to the data packet is referring to the lost data packet/the un-lost data packet, the value of each bit indicates whether the data packet represented by the bit is lost; if the above information related to the data packet is referring to the data packet successfully transmitted to the user/the data packet unsuccessfully transmitted to the user, the value of each bit indicates whether the data packet represented by the bit is successfully transmitted to the user; if the above information related to the data packet is referring to the data packet successfully transmitted to the next hop node of the node 1/the data packet unsuccessfully transmitted to the next hop node of the node 1, the value of each bit indicates whether the data packet represented by the bit is successfully transmitted to the next hop node of node 1)

Form 5: maximum identification of the data packet+the number of the data packets Form 6: when the identification of the data packet is not continuous, a plurality of data packet ranges may be defined and the number of such ranges may be indicated. Each of the ranges may be indicated by the minimum identification of the range and the maximum identification of the range, or by the minimum identification of the range and the number of data packets, or by the maximum identification of the range and the number of data packets, or by the minimum identification of the range and the bitmap, or by the maximum identification of the range and the bitmap.

Form 7: maximum and/or minimum identification of the data packet, the identification may be acquired by the node 1 through its judgment according to its own situation, may also be acquired by the node 1 according to related information transmitted by other nodes (such as information related to the data packet transmitted by other nodes), or may also be acquired by the node 1 through its own situation and the related information transmitted by other nodes (such as information related to the data packet transmitted by other nodes).

In the above forms, the maximum/minimum identification of the data packet may be understood as, if the data packet is referring to the data packet to be retransmitted, the maximum/minimum identification may be the maximum/minimum identification among all the data packets to be retransmitted, or may also be the maximum/minimum identification among data packets to be retransmitted in-sequence. For example, if the data packets to be retransmitted are 1, 2, 3, 5, 6, and 7, then the maximum/minimum identification among the data packets to be retransmitted in-sequence may be 3/1 (the maximum identification is 3 and the minimum identification is 1 in the sequenced data packets 1, 2, 3) and/or 7/5 (the maximum identification is 7 and the minimum identification is 5 in the sequenced data packets 5, 6, 7), and the maximum/minimum identification in all the data packets to be retransmitted may be 7/1.

If the data packet is referring to the cached data packet, the maximum/minimum identification may be the maximum/minimum identification among all the cached data packets, or may also be the maximum/minimum identification among the data packets cached in-sequence. For example, if the cached data packets are 1, 2, 3, 5, 6, and 7, then the maximum/minimum identification among data packets cached in-sequence may be 3/1 (the maximum/minimum identification is 3/1 in the sequenced data packets 1, 2, 3) and/or 7/5 (the maximum/minimum identification is 7/5 in the sequenced data packets 5, 6, 7), and the maximum/minimum identification among all the cached data packets may be 7/1.

If the data packet is referring to the lost data packet, the maximum/minimum identification may be the maximum/minimum identification among all the lost data packets, or may also be the maximum/minimum identification among the in-sequence lost data packets. For example, if the lost data packets are 1, 2, 3, 5, 6, and 7, then the maximum/minimum identification among the in-sequence lost data packets may be 3/1 (the maximum/minimum identification is 3/1 among the in-sequence lost data packets 1, 2, 3) and/or 7/5 (the maximum/minimum identification is 7/5 among the in-sequence lost data packets 5, 6, 7), and the maximum/minimum identification among all the lost data packets may be 7/1.

If the data packet is referring to the data packet successfully transmitted to the user or the next hop node, the maximum/minimum identification of the data packet may be the maximum/minimum identification among the data packets successfully transmitted to the user or the next hop node in sequence, or may also be the maximum/minimum identification among the data packets successfully transmitted to the user or the next hop node. For example, if the data packets transmitted to the user or the next hop node are 1, 2, 3, 5, 6, and 7, then the maximum/minimum identification among the data packets successfully transmitted to the user or the next hop node in sequence may be 3/1, and the maximum/minimum identification among the data packets successfully transmitted to the user or the next hop node is 7/1. The above maximum identification of the data packets successfully transmitted to the user or the next hop node in sequence may refer to the Highest successfully delivered/transmitted NR PDCP sequence number in TS38.425.

Identification information of the node where the data packet is located (such as DU ID, IAB Node ID, C-RNTI, etc.)

Identification of the user to which the data packet belongs (such as C-RNTI, DU UE F1AP ID, CU UE F1AP ID, etc.)

Identification of the bearer to which the data packet belongs (such as DRB ID, SRB ID, etc.)

Identification capable of indicating the user and the bearer to which the data packet belongs (e.g., UE bearer specific ID)

For the above information related to the data packet, if it is referring to the data packet to be retransmitted, it is "information related to the data packet to be retransmitted"; if it is referring to the cached data packet, it is "information related to the cached data packet"; if it is referring to the lost data packet, it is "information related to the lost data packet"; if it is referring to the data packet successfully transmitted to the user, it is "information related to the data packet successfully transmitted to the user"; if it is referring to the data packet successfully transmitted to the next hop node of the node 1, it is "information related to the data packet successfully transmitted to the next hop node of the node 1"; if it is referring to the data packet to be not retransmitted, it is "information related to the data packet to be not retransmitted"; if it is referring to the un-cached data packet, it is "information related to the un-cached data packet"; if it is referring to the un-lost data packet, then it is "information related to the un-lost data packet"; if it is referring to the data packet unsuccessfully transmitted to the user, it is "information related to the data packet unsuccessfully transmitted to the user"; if it is referring to the data packet unsuccessful transmitted to the next hop node of the node 1, it is "information related to the data packet unsuccessfully transmitted to the next hop node of the node 1".

Message 1 may include "information related to the data packet to be retransmitted", and/or "information related to the cached data packet", and/or "information related to the lost data packet", and/or "information related to the data packet successfully transmitted to the user", and/or "information related to the data packet successfully transmitted to the next hop node of the node 1", and/or "information related to the data packet to be not retransmitted", and/or "information related to the un-cached data packet", and/or "information related to the un-lost data packet", and/or "information related to the data packet unsuccessfully transmitted to the user", and/or "information related to the data packet unsuccessfully transmitted to the next hop node of the node 1".

The information related to the data packet may also include at least one of the following information:

Indication information that indicates the type of the data packet to which the above "information related to the data packet" is referring, that is, indicates whether it is referring to the data packet to be retransmitted, or the cached data packet, or the lost data packet, or the data packet successfully transmitted to the user, or the data packet successfully transmitted to the next hop node of the node 1, or the data packet to be not retransmitted, or the un-cached data packet, or the un-lost data packet, or the data packet unsuccessfully transmitted to the user, or the data packet unsuccessfully transmitted to the next hop node of the node 1.

Indication of radio link outage/resume (radio link outage/resume)

Indication of uplink or downlink radio link outage/resume

Indication information that indicates a link in which the above-mentioned "radio link outage/resume" and/or "uplink or downlink radio link outage/resume" occurs (such as the identification information of the receiving end node of the link, the identification information of the transmitting end node of the link, the identification information of the node close to the anchor node of the link, the identification information of the node far away from the anchor node of the link, information of the number of paths to the anchor node in the path where the link is located, and information of the number of paths to the user in the path where the link is located, etc).

Indication information indicating that the node 2 stops the data transmission. Further, the indication information may also indicate the identification of the user to which the data stopping transmission belong, or may also indicate the identification of the bearer to which the data stopping transmission belong as well as the identification of the user to which the data stopping transmission belong, or may also indicate that the entire node 2 stops data transmission.

Size information of the cache available at the node 1 (the available cache may be referring to one user, or one bearer of one user, or the entire node).

Information of the rate at which the node 1 expects the node 2 to transmit data to the node 1 (the rate information may be referring to one user, or one bearer of one user, or the entire node).

Policy information of caching the data at the node 1, such as the indicated cache policy may be that the node 1 caches the received data, may also be that the node 1 caches the data received and not correctly transmitted to other nodes, may also be that the node 1 caches the data received and not correctly transmitted to the user, or may also be that the node 1 caches the data received and not correctly transmitted to the user in sequence. Further, the policy of caching data may also further indicate the identification of the user to which the policy is referring, or the identification of the user's bearer to which the policy is referring, or the identification of the user and the identification of the bearer to which the policy is referring.

Identification information of the destination node of message 1, indicating the node that ultimately receives the message 1.

Indication information indicating that the node 2 reports the above information related to the data.

Indication information indicating the type of the data packet to which the information related to the data packet transmitted by the node 2 is referring (for example, the data packet may be the data packet to be retransmitted, may also be the cached data packet, may also be the lost data packet, may also be the data packet successfully transmitted to the user, may also be the data packet successfully transmitted to the next hop node of the node 2, may also be the data packet to be not retransmitted, may also be the un-cached data packet, may also be the un-lost data packet, may also be the data packet unsuccessfully transmitted to the user, or may also be the data packet unsuccessfully transmitted to the next hop node of the node 2), the indication information may represent one or more of types of the data packet to which the information related to the data packet is referring.

Identification information indicating other nodes that need to report the above information related to the data.

Indication information indicating the type of the data packet to which the above information related to the data reported by the individual other nodes is referring (for example, the data packet may be the data packet to be retransmitted, may also be the cached data packet, may also be the lost data packet, may also be the data packet successfully transmitted to the user, may also be the data packet successfully transmitted to the next hop node of the other nodes, may also be the data packet to be not retransmitted, may also be the un-cached data packet, may also be the un-lost data packet, may also be the data packet unsuccessfully transmitted to the user, or may also be the data packet unsuccessfully transmitted to the next hop node of the other nodes), the indication information may represent one or more of types of the data packet to which the information related to the data packet is referring.

Identification information indicating the destination node that receives the information related to the data packet.

Identification information indicating the node (i.e., the next hop node) that directly receives the information related to the data packet transmitted by the node 2.

Information indicating whether the node 2 continues to serve the user. Further, if the node 2 no longer continues to serve the user, the cached packet on the node belongs to the packet to be retransmitted. If the node 2 continues to serve the user, the packet in the node cache does not need to be retransmitted.

Identification indicating the node that continues to serve the user. Further, for the node that continues to serve the user, the packet in the cache thereof does not need to be retransmitted.

Identification indicating the node that no longer serves the user. Further, for the node that no longer serves the user, the packet in the cache thereof needs to be retransmitted.

Information indicating whether the node 1 needs to update the received above data-related information transmitted from other nodes.

Information indicating that a trigger condition for transmitting message 1 is that the path of communication between the user and the anchor node has changed.

Before Step 1, optionally, the process further includes:

Step 0: The node 1 receives the message 2 from a node 3. The node 3 may be an anchor node, may also be a relay node, may also be a distributed unit of the base station, or may also be a central unit of the base station. The node 3 may be the same node as the node 2, or may also be a different node from the node 2. The message 2 is mainly used to indicate the behavior of the node 1 by configuring the node 1, and includes at least one of the following information:

Indication information indicating that the node 1 reports the above information related to the data.

Indication information indicating the type of the data packet to which the information related to the data packet transmitted by the node 1 is referring (for example, the data packet may be a data packet to be retransmitted, may also be a cached data packet, may also be a lost data packet, may also be a data packet successfully transmitted to the user, may also be a data packet successfully transmitted to the next hop node of node 1, may also be a data packet to be not retransmitted, may also be an un-cached data packet, may also be an un-lost data packet, may also be a data packet unsuccessfully transmitted to the user, or may also be a data packet unsuccessfully transmitted to the next hop node of the node 1). The indication information may indicate one or more of types of the data packet.

Identification information indicating other nodes that need to report the above information related to the data.

Indication information indicating the type of the data packet to which the above information related to the data reported by each of the other nodes is referring (for example, the data packet may be a data packet to be retransmitted, may also be a cached data packet, may also be a lost data packet, may also be a data packet successfully transmitted to the user, may also be a data packet successfully transmitted to its next hop node, may also be a data packet to be not retransmitted, may also be an un-cached data packet, may also be an un-lost data packet, may also be a data packet unsuccessfully transmitted to the user, or may also be a data packet unsuccessfully transmitted to the next hop node of the other node). The indication information may indicate one or more of types of the data packet.

Identification information indicating the destination node that receives the information related to the data packet.

Identification information indicating the node (i.e., the next hop node) that directly receives the information related to the data packet transmitted by the node 1

Indication information indicating that the node 1 stops data transmission. Further, the indication information may further indicate the identification of the user to which the data stopping transmission belongs, or may also indicate the identification of the user to which the data stopping transmission belongs and the identification of the bearer to which the data stopping transmission belongs, or may also indicate that the entire node 1 stops transmitting data.

Configuration information configuring the policy of caching data at the node 1, such as the indicated cache policy may be that the node 1 caches the received data, may also be that the node 1 caches the data received and not correctly transmitted to other nodes, may also be that the node 1 caches the data received and not correctly transmitted to the user, or may also be that the node 1 caches the data received and not correctly transmitted to the user in sequence. Further, the policy of caching data may further indicate the identification of the user to which the policy is referring, or the identification of the user's bearer to which the policy is referring, or the identification of the user and the identification of the bearer to which the policy is referring.

Indication information indicating the policy information on caching data at other nodes (e.g., the node 2), such as the indicated cache policy may be that the other node caches the received data, may also be that the node caches the data received and not correctly transmitted to other nodes, may also be that the node caches the data received and not correctly transmitted to the user, or may also be that the node caches the data received and not correctly transmitted to the user in sequence. Further, the policy of caching data may further indicate the identification of the user to which the policy is referring, or the identification of the user's bearer to which the policy is referring, or the identification of the user and the identification of the bearer to which the policy is referring.

Information indicating whether the node 1 continues to serve the user. Further, if the node 1 no longer continues to serve the user, the packet cached on the node belongs to the packet to be retransmitted. If the node 1 continues to serve the user, the packet in the node cache does not need to be retransmitted.

Identification indicating the node that continues to serve the user. Further, for the node that continues to serve the user, the packet in the cache thereof does not need to be retransmitted.

Identification indicating the node that no longer serves the user. Further, for the node that no longer serves the user, the packet in the cache thereof needs to be retransmitted.

Information indicating whether the node 1 needs to update the received above data-related information transmitted from other nodes.

Information indicating the node 1 stops reporting information related to the lost data.

Information indicating the node 1 begins to report information related to the lost data Further, before Step 1, optionally, the process further includes:

Step a: receiving, by the node 1, a message 3 from a node 4, wherein the message 3 contains at least one of the information contained in the message 1, but the content of the information is generated by the node 4. After receiving the message 3, the node 1 may generate the content in message 1 according to the content in the message 3. The node 4 may be an anchor node, or a relay node, or a distributed unit of a base station, or a central unit of a base station. The node 4 may be the same node as the node 2, or may be a different node from the node 2.

The above Step 0 and Step a may be performed simultaneously, or Step 0 may be performed before Step a, or Step a may be performed before Step 0.

Further, after Step 1, optional, the process further includes:

Step 2: transmitting, by the node 2, the message 1 received in Step 1 to the anchor node. The message 1 may be transmitted directly to the anchor node, or may also be forwarded to the anchor node via an intermediate node. This message 1 may be updated or simply forwarded by node 2 or other nodes during the transmission process.

Further, after Step 2, optionally, the process further includes:

Step 3: transmitting, by the node that has cached the data packet to be retransmitted (such as node 2 or other node or anchor node, or any node of the nodes 1/2/3/4 involved in the above steps), the data packet to the user. If it is transmitted by the anchor node, in one embodiment, it may be transmitted by the distributed unit of the anchor node, and in another embodiment, it may be transmitted by the central unit of the anchor node. The data packet may be a data packet that is judged by the node 2 or other node or the anchor node to be retransmitted. Further, when the data packet is transmitted, the node that receives the data packet (the node may be the relay node, or may also be a user) is indicated that the data packet is a retransmitted data packet.

Each of the above steps may be an independent step, i.e., the step is not required to be performed in conjunction with other steps. In addition, the above steps a/0/1/2/3 may be not required to be all performed, for example, any two steps may be selected. For example, Step 3 is performed immediately after performing Step a, or Step 3 is performed immediately after performing Step 1.

In the above Step 1, the message 1 may be directly transmitted by the node 1 to the node 2, or may be transmitted by the node 1 to the node 2 via one or more nodes (or relay nodes), wherein the one or more nodes may simply forward the message 1, or may update the message 1 and then transmit it.

In the above Step 0, the message 2 may be directly transmitted by the node 3 to the node 1, or may be transmitted by the node 3 to the node 1 via one or more nodes (or relay nodes), wherein the one or more nodes may simply forward the message 2, or may update the message 2 and then transmit it.

In the above Step a, the message 3 may be directly transmitted by the node 4 to the node 1, or may be transmitted by the node 4 to the node 1 via one or more nodes (or relay nodes), wherein the one or more nodes may simply forward the message 3, or may update the message 3 and then transmit it.

In the above Step 2, the received message 1 may be directly transmitted by the node 2 to the anchor node, or may be transmitted by the node 2 to the anchor node via one or more nodes (or relay nodes), wherein the one or more nodes may simply forward the message 1, or may update the message 1 and then transmit it.

In the above Step 3, the node that has cached the data packet to be retransmitted (such as node 2 or other node or anchor node) may directly transmit the data to the user, or the node that has cached the data packet to be retransmitted (such as node 2 or other node or anchor node) may transmit the data to the user via one or more nodes (or relay nodes).

Note that the content of the message 1/2/3 involved in the above steps may be transmitted in one of the following transmission formats:

- Being included in a header of the data packet of the RLC layer
- Being included in a newly defined data packet type of RLC layer
- Being included in a data packet or data packet header of a newly defined protocol layer (such as a newly defined adaptation layer, see TR38.874)
- Being included in a header of the data packet of the MAC layer
- Being included in a downlink data delivery status (DL Data Delivery Status) or downlink user data (DL USER DATA) defined by the user plane of the F1 interface, see TS38.425
- Being included in a message of the control plane The above formats are just examples and do not exclude other transmission formats.

The effect of the above process is that, when the path through which the anchor node communicates with the user changes (from the old path to the new path) or the anchor node that communicates with the user changes (from anchor node 1 to anchor node 2, or from the distributed unit 1 of the anchor node 1 to the distributed unit 2 of the anchor node 1), the anchor node can know the data packet to be retransmitted in the new path or by the anchor node 2 or by the distributed unit 2 of the anchor node 1 (the reason why these data packets are considered to be the data packet to be retransmitted is that the data packet has started to be transmitted in the old path but not transmitted to the user, or the data packet has been transmitted by the anchor node 1 or the distributed unit 1 of the anchor node 1 but not transmitted to the user).

In order to further explain the effect of the foregoing process, the further description is made in combination with a plurality of examples, mainly for the information contained in the message 1 being the information related to the data packet to be retransmitted as an example. For the included information related to other types of the data packet, the same may be deduced similarly.

Figure 4:
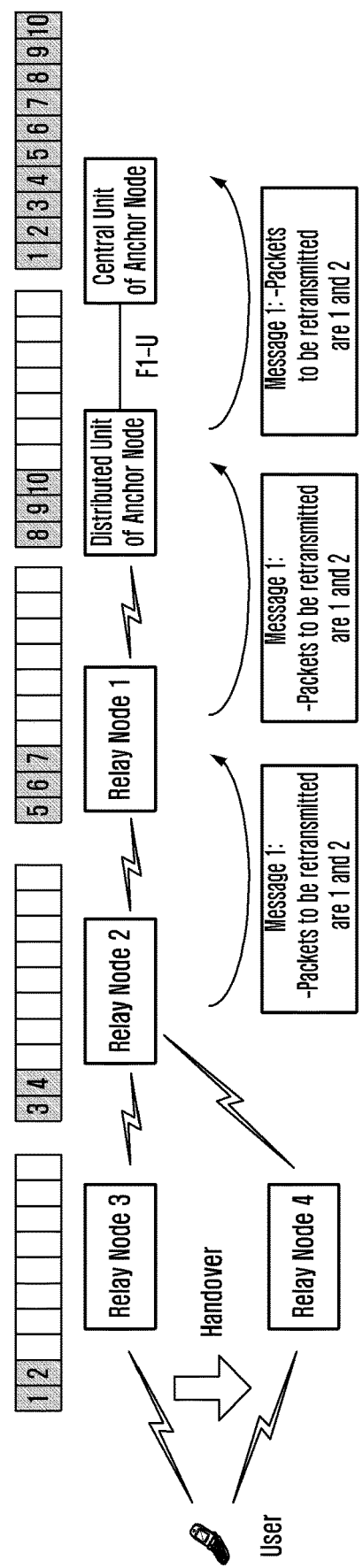
FIG. 4 illustrates an example of transmitting information related to the data packet to be retransmitted during handover according to an embodiment of the present disclosure.

For the case of handover, as shown in FIG. 4, the path through which the user communicates with the central unit of the anchor node is the central unit of the anchor node→the distributed unit of the anchor node→the relay node 1→the relay node 2→the relay node 3→the user. In this path, the central unit of the anchor node has transmitted data packets 1~10, the data packets 8, 9, 10 are cached in the distributed unit of the anchor node, the data packets 5, 6, and 7 are cached in relay node 1, the data packets 3, 4 are cached in the relay node 2, and the data packets 1, 2 are cached in the relay node 1. At this time, the user performs handover, which causes the path through which the user communicates with the anchor node to change, that is, the path becomes the central unit of the anchor node→the distributed unit of the anchor node→the relay node 1→the relay node 2→the relay node 4→the user. The only change of the new path is that the relay node 3 becomes the relay node 4 compared to the path before the handover. In this case, the packets 1, 2 cached on the relay node 3 need to be retransmitted to the user by the central unit of the anchor node. In order to inform the anchor node of the packets to be retransmitted, the relay node 2 will inform the relay node 1 that the data packets to be retransmitted are 1 and 2 (this is equivalent to the information related to the data packet to be retransmitted included in the message 1 of Step 1 in the above process). After receiving this information, the relay node 1 judges whether to update the information of the packets to be retransmitted according to its own situation. In this example, the relay node 1 does not need to update the information, so it simply forwards the information received from the relay node 2 to the distributed unit of the anchor node, and similarly the distributed unit of the anchor node transmits the information to the central unit of the anchor node. Thus, the central unit of the anchor node may know that it needs to retransmit the data packets 1, 2 to the user.

Figure 5:
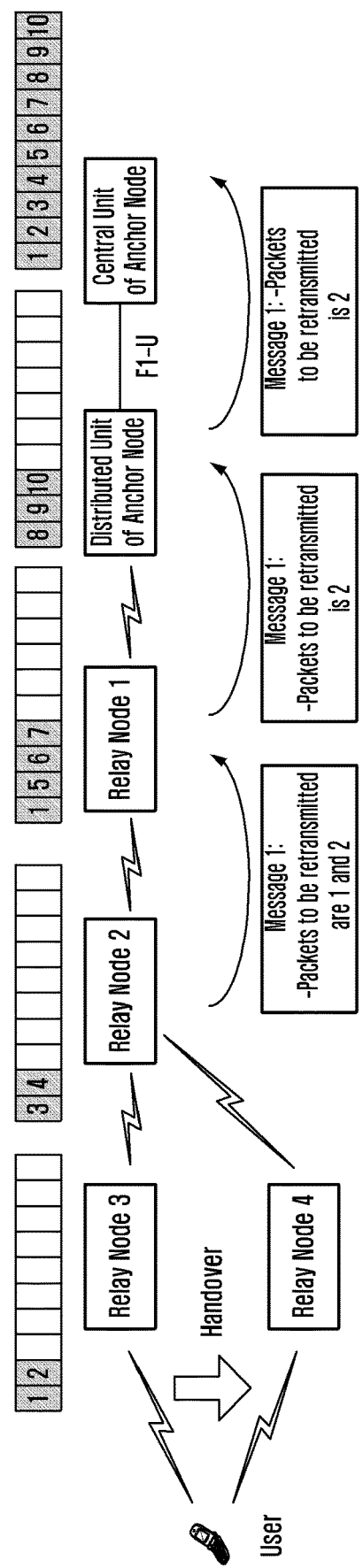
FIG. 5 illustrates another example of transmitting information of the data packet to be retransmitted during handover according to an embodiment of the present disclosure.

In another embodiment, as shown in FIG. 5, still according to the example illustrated in FIG. 4, the difference from FIG. 4 is that the data packets cached on the relay node 1 are 1, 5, 6, and 7. The relay node 2 informs the relay node 1 that the data packets to be retransmitted are 1 and 2 (this is equivalent to the information related to the data packets to be retransmitted included in the message 1 of Step 1 in the above process). After receiving the information, the relay node 1 finds that there is still the data packet 1 in its cache, and the message transmitted by the relay node 1 to the anchor node may indicate that the packet to be retransmitted is the packet 2. And further, the message transmitted by the distributed unit of the anchor node to the central unit of the anchor node may support the packet to be retransmitted as the packet 2. So finally, the anchor node retransmits the packet 2, and the relay node 1 retransmits the packet 1.

Figure 6A:
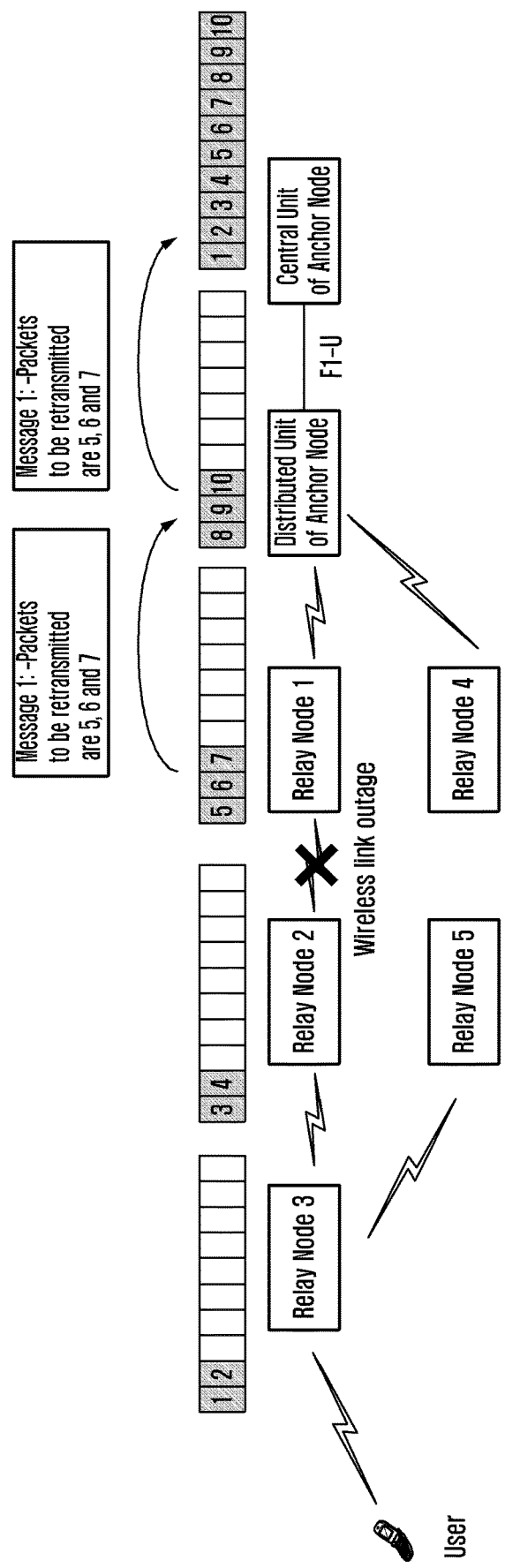
FIG. 6a illustrates still another example of transmitting information of the data packet to be retransmitted in the event of a link outage, according to an embodiment of the present disclosure.

For the case of radio link outage, as shown in FIG. 6a, two paths are established between the user and the central unit of the anchor node for communication, and the path 1 is the central unit of the anchor node→the distributed unit of the anchor node→the relay node 1→the relay node 2→the relay node 3→the user, the path 2 is the central unit of the anchor node→the distributed unit of the anchor node→the relay node 4→the relay node 5→the relay node 3→the user. In the path 1, the central unit of the anchor node has transmitted packets 1~10, the packets 8, 9, 10 are cached in the distributed unit of the anchor node, the packets 5, 6, and 7 are cached in relay node 1, the packets 3, 4 are cached in the rely node 2, and the packets 1, 2 are cached in the relay node 1. The anchor node does not use path 2 to transmit data to the user. When the link between the relay node 1 and the relay node 2 in the path 1 is outage, the anchor node may use the path 2 to communicate with the user. The relay node 1 may transmit a message to the distributed unit of the anchor node indicating that the packets to be retransmitted are 5, 6, 7 (this message is equivalent to the message 1 of Step 1 in the above process, the information included is equivalent to the information related to the data packets to be retransmitted). After receiving the message 1, the distributed unit of the anchor node finds that the message 1 does not need to be updated, and then forwards the message 1 to the central unit of the anchor node. The anchor node will transmit the data packets 5, 6, and 7 to the user via the path 2. Further, the relay node 1 may indicate, in the message 1, that the data packets transmitted to the next hop node are 1, 2, 3, 4, or the data packets 1, 2, 3, 4 are also the packets to be retransmitted. In this way, the anchor node will also retransmit the data packets 1, 2, 3, and 4.

The message defined in the above description is mainly explained for information for acquiring the packets to be retransmitted, but the content included in the message defined by the present disclosure (such as message 1/2/3) is not limited to judgments for retransmitting the data packets, and may also have other uses, as described below.

1. Examples of other uses of the information contained in Message 1:

Example 1—Message 1 Contains at Least One of the Following Information

Indication of radio link outage/resume
Indication of uplink or downlink radio link outage/resume
Indication information indicating a link in which the above "radio link outage/resume" and/or "uplink or downlink radio link outage/resume" occurs The node receiving the above information may determine that the radio link outage/resume has occurred (for example, the channel quality has become good), and further, may determine whether the above outage/resume is referring to the uplink of the radio link or the downlink of the radio link, or both uplink and downlink, and further, may determine the radio link in which the above outage/resume has occurred (such as the radio link between which two nodes). One of the possible actions of the node receiving the above information is to transmit the above information to another node. In another embodiment, the node establishes another communication link with the user (the user may be a relay node or an end user). In another embodiment, the node communicates with the user (the user may be a relay node or an end user) using another link that has already been established. The purpose of including the above information is to notify other nodes of the state of the radio link, and further change the link in communication with the user (the user may be a relay node or an end user).

Example 2—Message 1 Contains the Following Information

Indication information indicating that the data transmission is stopped, and further the indication information may further indicate the identification of the user to which the data stopping transmission belongs, may also indicate the identification of the user to which the data stopping transmission belongs and the identification of the bearer to which the data belongs, or may also indicate that the node stops data transmission.

The node receiving the indication information stops transmitting the data indicated by the indication information. In one embodiment, the node 1 transmits the above indication information to the node 2. The node 1 can send such indication information after receiving the indication information indicating to stop data transmission from the other node, or the node 1 may send such indication upon finding that the radio link for transmitting the data has problem, or the node 1 may send such indication when it has no available cache. The purpose of this information is to reduce unnecessary data transmission at other nodes.

Example 3—Message 1 Contains at Least One of the Following Information

Size information of the cache available at the transmitting node (the available cache may be for one user, or for one bearer of one user, or for the entire node)
Rate information expected by the transmitting node at which the receiving node transmits data to it (the rate information may be for one user, or for one bearer of one user, or for the entire node)

If the message 1 transmitted by the node 1 to the node 2 contains the above information, in one embodiment, the node 2 determines the amount of data transmitted to the node 1 according to the above size information of the available cache. In another embodiment, the node 2 determines the amount of data transmitted to node 1 over a certain period of time according to the above rate information for transmitting the data. The purpose of these two pieces of information is to help the receiving node control the number and rate of data transmissions to avoid congestion at the nodes.

Example 4—Message 1 Contains the Following Information

Policy information of caching data at the transmitting node, for example, the indicated cache policy is to cache the received data, or cache the data received and not correctly transmitted to other nodes, or cache the data received and not correctly transmitted to the user, or cache the data received and not correctly transmitted to the user in sequence; further, the policy of caching data may further indicate the identification of the user to which the policy is referring, or the identification of the bearer of the user to which the policy is referring, or the identification of the user and the identification of the bearer to which the policy is referring.

If the message 1 transmitted by the node 1 to the node 2 contains the above information, in one embodiment, the node 2 may determine whether the data transmitted to the node 1 is all cached by the node 1, or only a part thereof is cached. In another embodiment, the node 2 may determine whether the data transmitted to the node 1 needs to be retransmitted to the node 1. The purpose of the above information is to help the receiving node determine how to transmit data to the transmitting node.

Example 5—Message 1 Contains at Least One of the Following Information

Indication information indicating that the receiving node reports the above information related to the data
Indication information indicating the type of the data packet to which the information related to the data packet transmitted by the receiving node is referring, and the indication information may indicate one or more of types of the data packet
Identification information indicating other nodes that need to report the above information related to the data Indication information indicating the type of the data packet to which the above information related to the data reported by each of other nodes is referring, and the indication information may indicate one or more of types of the data packet If the message 1 transmitted by the node 1 to the node 2 contains the above information, in one embodiment, when "Indication information indicating that the receiving node reports the above information related to the data" and/or "Indication information indicating the type of the data packet to which the information related to the data packet transmitted by the receiving node is referring" is contained, the node 2 performs reporting of the information related to the data according to the received information, the reporting means that the node 2 transmits the information to the other nodes; in another embodiment, when "Identification information indicating other nodes that need to report the above information related to the data" and/or "Indication information indicating the type of the data packet to which the above information related to the data reported by each of other nodes is referring" is contained, if node 2 is a node indicated by the above "Identification information indicating other nodes that need to report the above information related to the data", the node performs reporting of the information related to the data according to the received information, and the reporting means that the node 2 transmits the information to the other nodes, if not, the node will not performing the reporting, and further the node may forward the received information to other nodes. The purpose of the above information is to configure the receiving node to perform reporting of the information related to the data.

Example 6—Message 1 Contains at Least One of the Following Information

Information indicating whether the receiving node continues to serve the user
Identification information indicating the node that continues to serve the user
Identification information indicating the node that no longer serves the user.

If the message 1 transmitted by the node 1 to the node 2 contains the above information, when "Information indicating whether the receiving node continues to serve the user" is contained, in one embodiment, if the receiving node is indicated to continue to serve the user, the receiving node will continue to store the data in the cache, or the receiving node will consider that the data in its cache does not need to be retransmitted; in another embodiment, if the receiving node is indicated to not serve the user, the receiving node will delete the data in its cache, or the receiving node will consider that the data in its cache needs to be retransmitted, and further the receiving node will transmit the data packets to be retransmitted to other nodes, and further, the receiving node will inform other nodes of the data packets to be retransmitted. If "Identification indicating the node that continues to serve the user" and/or "Identification indicating the node that no longer serves the user" is contained, the receiving node judges whether it will continue to serve the user, and performs processing of the cached data according to the judgment result (such as clearing the relevant data in the cache, retaining the relevant data in the cache), or performs reporting of the data to be retransmitted. Further, after receiving the above information, the node 2 transmits it to other nodes. The purpose of the above information is to help the receiving node determine the processing of its cached data (such as clearing the relevant data in the cache, retaining the relevant data in the cache), or perform reporting of the data to be retransmitted.

2. Examples of other uses of the information contained in Message 2:

Example 7—Message 2 Contains at Least One of the Following Information

Indication information indicating that the receiving node reports the above information related to the data
Indication information indicating the type of the data packet to which the information related to the data packet transmitted by the receiving node is referring, and the indication information may indicate one or more of types of the data packet.
Identification information indicating other nodes that need to report the above information related to the data.
Indication information indicating the type of the data packet to which the above information related to the data reported by each of other nodes is referring, and the indication information may indicate one or more of types of the data packet The behavior of the receiving node may refer to Example 5; Example 7—Message 2 contains the following information:
Indication information indicating that the data transmission is stopped, and further the indication information may further indicate the identification of the user to which the data stopping transmission belongs, may also indicate the identification of the user to which the data stopping transmission belongs and the identification of the bearer to which the data belongs, or may also indicate that the node stops data transmission The behavior of the receiving node may refer to Example 2;

Example 8—Message 2 Contains at Least One of the Following Information

Configuration information configuring the policy of caching data at the receiving node, for example, the indicated cache policy is to cache the received data, or cache the data received and not correctly transmitted to other nodes, or cache the data received and not correctly transmitted to the user, or cache the data received and not correctly transmitted to the user in sequence. Further, the policy of caching data may further indicate the identification of the user to which the policy is referring, or the identification of the bearer of the user to which the policy is referring, or the identification of the user and the identification of the bearer to which the policy is referring.
Indication information indicating the policy of caching data at other nodes, for example, the indicated cache policy may be that the other node caches the received data, may also be that the node caches the data received and not correctly transmitted to other nodes, may also be that the node caches the data received and not correctly transmitted to the user, or may also be that the node caches the data received and not correctly transmitted to the user in sequence. Further, the policy of caching data may further indicate the identification of the user to which the policy is referring, or the identification of the user's bearer to which the policy is referring, or the identification of the user and the identification of the bearer to which the policy is referring If the message 2 transmitted by the node 3 to the node 1 contains "Configuration information configuring the policy of caching data at the receiving node", the node 1 may cache the relevant data according to the above configuration information. If the message 2 contains "Indication information indicating the policy of caching data at other nodes", node 1 may obtain the cache policy information of other nodes, thereby determining the transmission or caching of the relevant data. In one embodiment, if "Indication information indicating the policy of caching data at other nodes" indicates that other nodes will cache the data transmitted by the node 1, the node 1 may delete the data that has been transmitted. Further, after receiving the above information, the node 1 may transmit the information to other nodes. The purpose of the above information is to help the receiving node to determine how to transmit or cache data to the transmitting node.

Example 9—Message 2 Contains at Least One of the Following Information

Information indicating whether the receiving node continues to serve the user
Identification indicating the node that continues to serve the user
Identification indicating the node that no longer serves the user
The behavior of the receiving node may refer to Example 6.

3. Examples of other usages of the information contained in Message 3 and the behaviors of the receiver and transmitter of Message 3 can refer to Examples 1~6.

4. The "information related to the data packet" contained in the above messages 1/2/3 may be referring to at least one of data packet types: the data packet to be retransmitted, the cached packet, the lost packet, the data packet successfully transmitted to the user, the data packet successfully transmitted to the next hop node, the data packet to be not retransmitted, the un-cached data packet, the un-lost data packet, the data packet unsuccessfully transmitted to the user, or the data packet unsuccessfully transmitted to the next hop node. In the above description, the information is mainly used to determine the data packet to be retransmitted, but the information may have other functions as well:

If the "information related to the data packet" is referring to the cached data packets, a node that receives this information, in one embodiment, may consider deleting the data packets already cached at other nodes, thus releasing more caches. In another embodiment, the node may consider transmitting the data packets, which are not cached by other nodes and already cached by the node, to the other nodes.
If the "information related to the data packet" is referring to the lost data packets, a node that receives this information, in one embodiment, may transmit the above lost data packets to other nodes in the event that the node has cached the above lost data packets. In another embodiment, the node may transmit the above "information related to the data packet" to other nodes in the event that the node has not cached the lost data packets.
If the "information related to the data packet" is referring to the data packets successfully transmitted to the user, a node that receives this information, in one embodiment, may delete the data packets received by the user.
In another embodiment, the node may forward the above "information related to the data packet" to other nodes.
If the "information related to the data packet" is referring to the data packets successfully transmitted to the next hop node, a node that receives this information, in one embodiment, may delete the data packets successfully transmitted to the next hop node. In another embodiment, the node may control the rate at which the data packets are transmitted.
If the "information related to the data packet" is referring to the un-cached data packets, a node that receives this information, in one embodiment, may inform other nodes of transmitting the above un-cached data packets. In another embodiment, the node may inform the other nodes that it does not have the cached packets.
If the "information related to the data packet" is referring to the un-lost data packets, a node that receives this information, in one embodiment, may delete the above un-lost data packets in the event that the node has cached the above un-lost data packets. In another embodiment, the node may transmit the above "information related to the data packet" to other nodes in the event that the node has not cached the un-lost data packets.
If the "information related to the data packet" is referring to the data packets unsuccessfully transmitted to the user, a node that receives this information, in one embodiment, may cache the data packets that are not received by the user. In another embodiment, the node may forward the above "information related to the data packet" to other nodes.
If the "information related to the data packet" is referring to the data packets unsuccessfully transmitted to the next hop node, a node that receives this information, in one embodiment, may retransmit the data packets unsuccessfully transmitted to the next hop node.

Figure 6B:
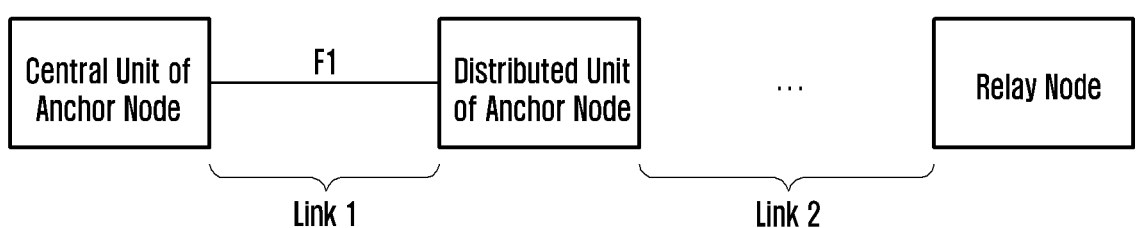
FIG. 6b illustrates an example of a network structure for retransmitting the lost data packet.

A second aspect of the disclosure involves implementing retransmission of a lost data packet in a relay network. As shown in FIG. 6b, this aspect involves three nodes, namely, a central unit of an anchor node, a distributed unit of the anchor node, and a relay node accessed by a user. Any one of the three nodes may be any one of the nodes 1 to 4 defined in the first aspect of the present disclosure. The relay node accessed by the user may be directly connected to the distributed unit of the anchor node, or may be connected through one or more other relay nodes.

The user's data packets transmitted by the central unit of the anchor node to the accessed relay node may be lost on the link (Link 1) between the central unit of the anchor node and the distributed unit of the anchor node, or may also be lost on the link (Link 2) between the distributed unit of the anchor node and the relay node. In the following description, the data packets may be data packets with respect to one user radio bearer, or may be data packets with respect to one user, or may be data packets with respect to one node.

According to the existing mechanism, the distributed unit of the anchor node may inform the central unit of the anchor node about the lost data packets (such as the identification information of the lost data packets) by the first message. And further, the relay node may also inform the central unit of the anchor node about the lost data packets (such as the identification information of the lost data packets) by the second message. Because the relay node and the distributed unit of the anchor node do not know whether the lost data packets are reported by each other, if both nodes report the same lost data packets, the central unit of the anchor node will retransmit the lost data packets after receiving the report of the two nodes respectively. Such repeated retransmission may increase the burden of the network and should be avoided as much as possible. In order to avoid this, the following methods may be used:

Method 1:

The central unit of the anchor node transmits configuration information to the distributed unit of the anchor node, and the configuration information includes at least one of the following information:

Information indicating that the lost packets are stopped to be reported; and

Identification information of the user radio bearer to which the above stopped reporting is referring.

After receiving the information, the distributed unit of the anchor node no longer reports the information of the lost data packets to the central unit of the anchor node.

Method 2:

The distributed unit of the anchor node modifies the information reported by the relay node according to the information that has been reported by the distributed unit of the anchor node. In this method, if the distributed unit of the anchor node receives the second message and then finds that the information related to the lost data packets (such as sequence numbers of the lost data packets) contained in the second message has been transmitted by the distributed unit of the anchor node in the first message to the central unit of the anchor node, the distributed unit of the anchor node may modify the received second message, so that the information related to the lost data packets that has been reported in the first message is not included any more. For example, if the sequence numbers of the lost data packets included in the second message are 1, 2, 3, and the sequence numbers 1, 2 have been reported in the first message, the distributed unit of the anchor node may modify the second message, thereby not including the lost packet sequence numbers of 1,2 any more Method 3:

The distributed unit of the anchor node may modify the information reported by the relay node according to the cached data packets thereof. In this method, if the distributed unit of the anchor node receives the second message reported by the relay node (the reported message will be finally transmitted to the central unit of the anchor node) and then finds that the lost data packets reported in the second message reported by the relay node have been cached at the distributed unit of the anchor node, the distributed unit of the anchor node may modify the received second message, so as not to transmit the data already cached at the distributed unit of the anchor node, as the lost data packets, to the central unit of the anchor node. For example, if the sequence numbers of the lost data packets included in the second message are 1, 2, 3, and the data packets 1 and 2 have been already cached at the distributed unit of the anchor node, the distributed unit of the anchor node may modify the second message, and only report the sequence number 3 of the lost data packets, and the data packets 1 and 2 may be retransmitted by the distributed unit of the anchor node.

Method 4:

The central unit of the anchor node transmits indication information to the distributed unit of the anchor node, wherein the indication information may indicate the data packets to be retransmitted by the distributed unit of the anchor node. In this method, the central unit of the anchor node transmits an indication message to the distributed unit of the anchor node after the central unit of the anchor node receives the second message reported by the relay node. Specifically, the following steps may be included:

Step a1: The relay node transmits a second message to the central unit of the anchor node, wherein the message includes the sequence numbers of the lost data packets.

Step a2: The central unit of the anchor node transmits a message indicating the retransmission of the data packets to the distributed unit of the anchor node, wherein the message includes at least one of the following information:

The sequence numbers of the data packets to be retransmitted, the sequence numbers may be the sequence numbers of the lost data packets included in the second message received in Step a1, or may be new sequence numbers corresponding to the lost data packets indicated in the second message;

The old sequence numbers of the data packets to be retransmitted;

The new sequence numbers of the data packets to be retransmitted, the distributed unit of the anchor node after receiving the sequence numbers, in one embodiment, may find its cached data packets according to the sequence numbers and retransmit them. In another embodiment, the distributed unit of the anchor node may find its cached data packets according to the above old sequence numbers of the data packets to be retransmitted, and then append the new sequence numbers to the data packets, and then retransmit the data packets;

Step a3: The distributed unit of the anchor node retransmits the data packets to be retransmitted.

In the above steps, Step a1 may be an optional step.

Figure 7:
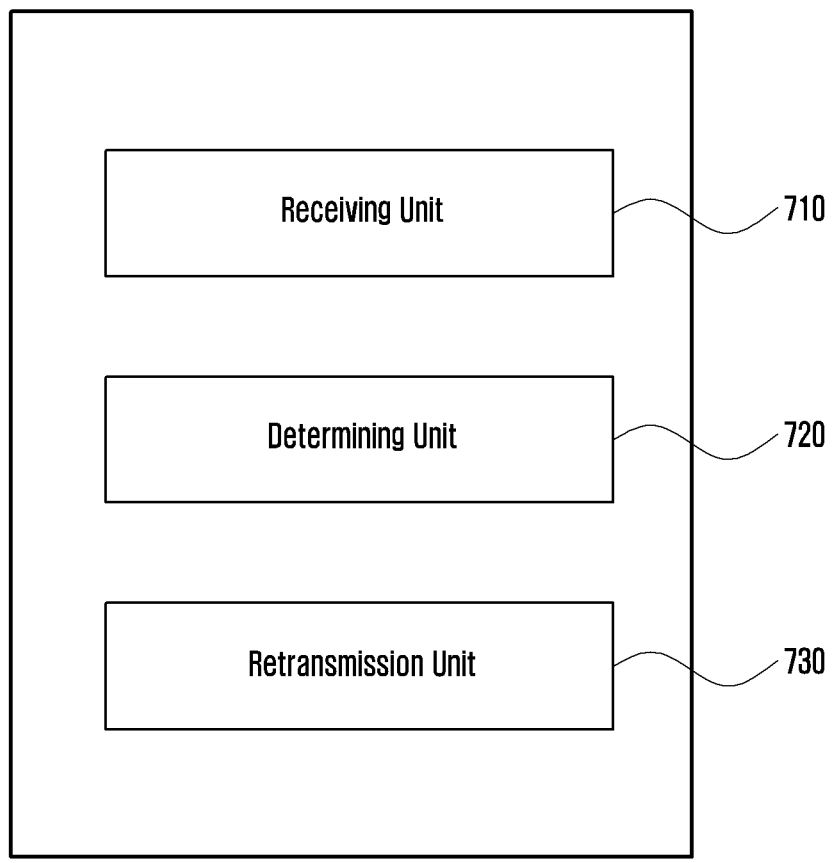
FIG. 7 is a block diagram showing an example of a device for data retransmission according to an embodiment of the present disclosure.

FIG. 7 is a block diagram showing an example of a device for data retransmission according to an embodiment of the present disclosure. The device 700 shown in FIG. 7 may generally be implemented in the second node described above, which may retransmit the data packets to be retransmitted. As shown in FIG. 7, the device 700 may include a receiving unit 710, a determining unit 720, and a retransmission unit 730.

In the device 700, the receiving unit 710 may be configured to receive a first message that is transmitted by a first node (e.g., a relay node) and includes information related to the data packet. As described above, the information related to the data packet may include information related to at least one of the data packet to be retransmitted, the data packet to be not retransmitted, the cached data packet at the first node, the un-cached data packet at the first node, the data packet successfully transmitted to the user, the data packet unsuccessfully transmitted to the user, the data packet successfully transmitted to the next hop node of the first node, the data packet unsuccessfully transmitted to the next hop node of the first node packet, the lost packet, and the un-lost data packet. The determining unit 720 may be configured to determine the data packet to be retransmitted. The retransmission unit 730 may be configured to retransmit the data packet to be retransmitted.

In one embodiment, the receiving unit 710 may be further configured to receive the first message from the first node that is sequentially forwarded by one or more nodes (e.g., other relay nodes than the first node). In one embodiment, the first message may contain information modified by the one or more nodes.

Figure 8:
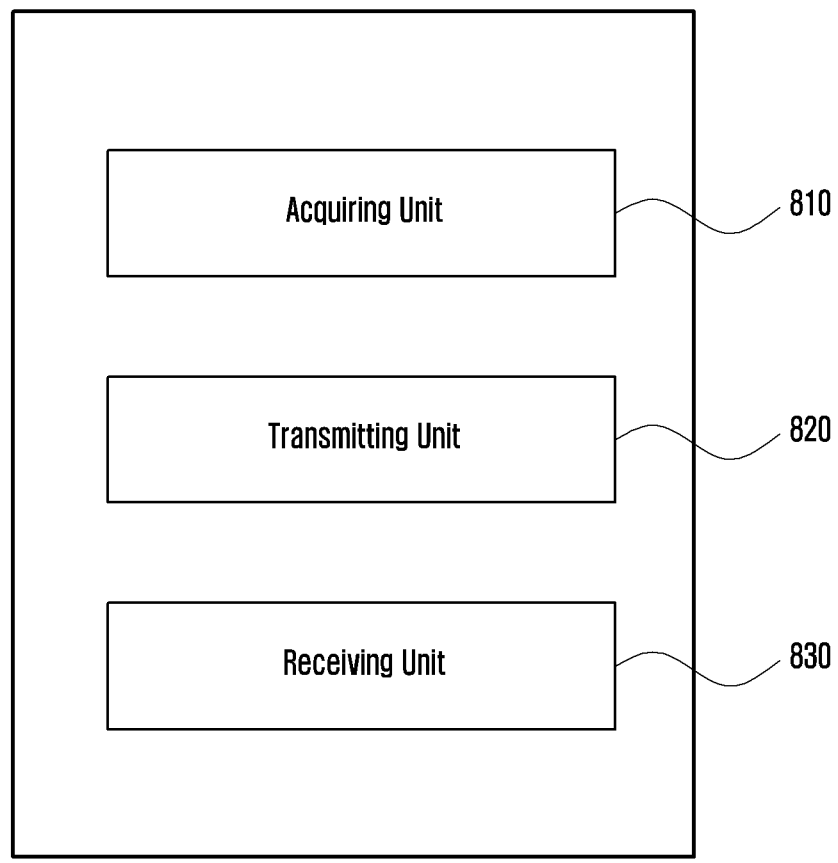
FIG. 8 is a block diagram showing an example of a device for data retransmission according to another embodiment of the present disclosure.

FIG. 8 is a block diagram showing an example of a device 800 for data retransmission according to another embodiment of the present disclosure. The device 800 for data retransmission shown in FIG. 8 may generally be implemented in the first node described above, which may acquire and transmit, or interact the information related to the data packet with other relay nodes for data retransmission. As shown in FIG. 8, the data retransmission device 800 may include an acquiring unit 810 and a transmitting unit 820. In a further embodiment, the data retransmission device 800 may further include a receiving unit 830.

In the device 800, the acquiring unit 810 may be configured to acquire the information related to the data packet. In one embodiment, the acquiring unit 810 may be further configured to acquire local information related to the data packet and acquire the information related to the data packet from the outside.

The device 800 may further include a determining unit configured to determine the data packet to be retransmitted according to the acquired information related to the data packet after acquiring the information related to the data packet by the acquiring unit; and the transmitting unit 820 may be configured to transmit information of the data packet to be retransmitted to a second node.

In the device 800, the transmitting unit 820 may be configured to transmit a first message including the information related to the data packet, wherein the information related to the data packet may include information related to at least one of the data packet to be retransmitted, the data packet to be not retransmitted, the cached data packet at the first node, the un-cached data packet at the first node, the data packet successfully transmitted to the user, the data packet unsuccessfully transmitted to the user, the data packet successfully transmitted to the next hop node of the first node, the data packet unsuccessfully transmitted to the next hop node of the first node, the lost packet, and the un-lost data packet.

In the device 800, the receiving unit 830 may be configured to receive a second message for configuring the data retransmission device, wherein the second message may include at least one of indication information indicating that the device reports the information related to the data packet, identification information indicating other nodes that need to report the information related to the data packet, identification information indicating a destination node that receives the information related to the data packet, identification information indicating a node that directly receives the information related to the data packet transmitted by the device, indication information indicating that the device stops data transmission, configuration information configuring the policy of caching data at the device, indication information indicating the policy of caching data at other nodes, information indicating whether the first node continues to serve, an identification indicating a node that continues to serve, an identification indicating a node that no longer serves the user, and indication information indicating whether the first node needs to update the received information related to the data packet transmitted from other nodes.

Figure 9:
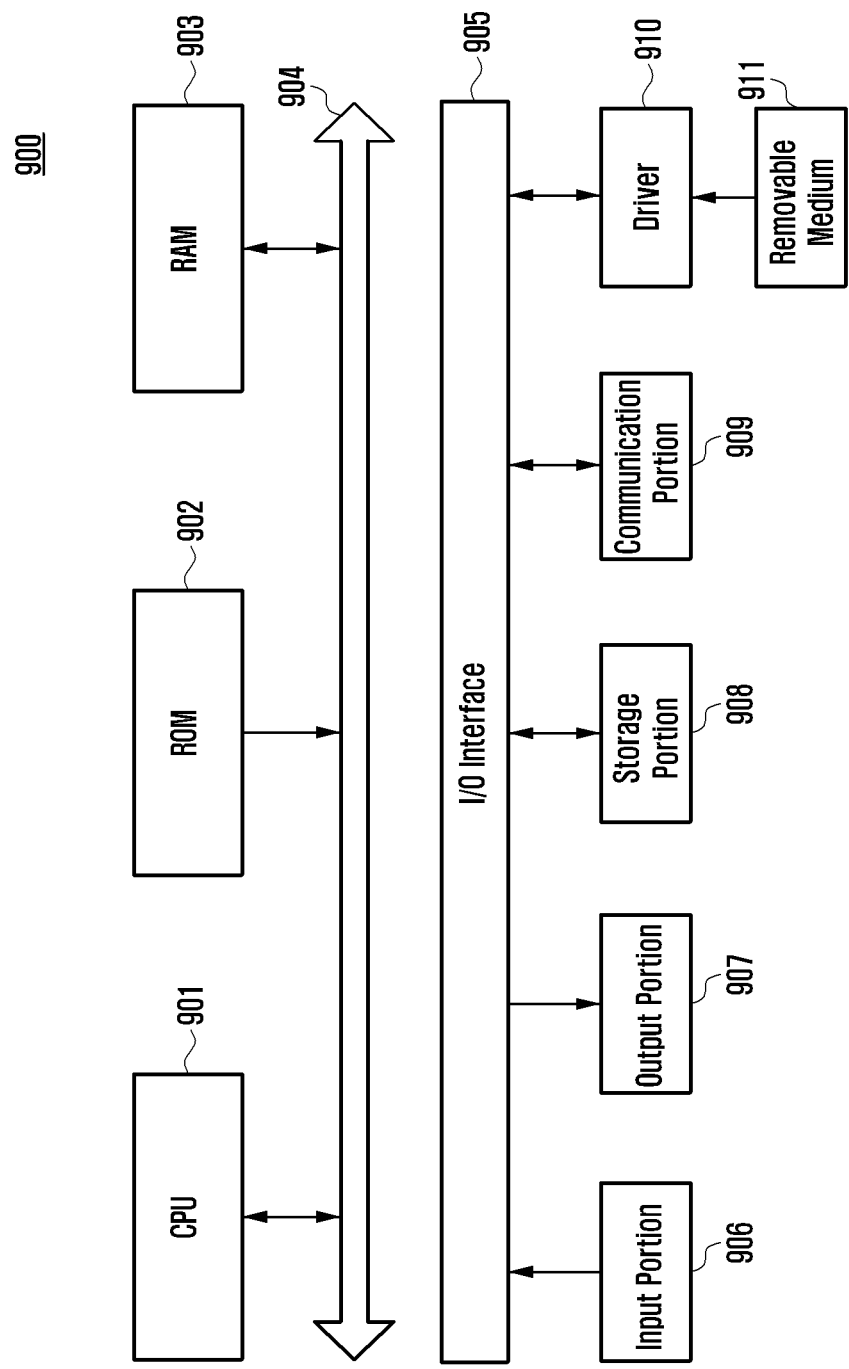
FIG. 9 is a structure schematic diagram showing a network node according to an embodiment of the present disclosure.

FIG. 9 is a structure schematic diagram showing a network node 900 according to an embodiment of the present disclosure. As shown in FIG. 9, the network node 900 may include a processor or processing unit (CPU) 901 that may perform various appropriate actions and processes according to a program stored in the read only memory (ROM) 902 or a program loaded into the random access memory (RAM) 903 from the storage portion 908. Various programs and data required for the operation of the network node 900 are also stored in the RAM 903. The processing unit 901, the ROM 902, and the RAM 903 may be connected to each other by a bus 904. An input/output (I/O) interface 905 may be also connected to the bus 904.

The following components may be connected to the I/O interface 905: an input portion 906 including a keyboard, a mouse, etc.; an output portion 907 including for example a cathode ray tube (CRT), a liquid crystal display (LCD), and a speaker, etc.; a storage portion 908 including a hard disk or the like; and a communication portion 909 including a network interface card such as a LAN card, a modem, etc. The communication portion 909 may perform communication processing via a network such as the Internet. A driver 910 may be also connected to the I/O interface 905 as needed. A removable medium 911 such as a magnetic disk, an optical disk, a magneto-optical disk, a semiconductor memory or the like may be mounted on the driver 910 as needed, so that a computer program read therefrom is installed into the storage portion 908 as needed.

In particular, the processes described in the above figures according to an embodiment of the present disclosure may be implemented as a computer software program. For example, an embodiment of the present disclosure includes a computer program product comprising a computer readable medium carrying instructions. In such an embodiment, the instructions may be downloaded and installed from the network via the communication portion 909, and/or installed from the removable medium 911. When the instructions are executed by the central processing unit (CPU) 901, the various method steps described in the present disclosure may be performed.

While the example embodiments have been described, it will be apparent to those skilled in the art that various changes and modifications may be made without departing from the spirit and scope of the disclosure. Therefore, it should be understood that the above exemplary embodiments are not limiting, but illustrative.

The invention claimed is:

1. A first integrated access and backhaul (IAB) node in a communication system, the first IAB node comprising:
  a transceiver; and
  a controller configured to:
    receive, from a third node, identification information indicating a second node which is to receive information on an available buffer size of the first IAB node from the first IAB node,
    receive, from the second node indicated by the identification information received from the third node, information indicating to report the information on the available buffer size of the first IAB node, via an adaptation layer associated with an IAB network, and
    transmit, to the second node indicated by the identification information received from the third node, the information on the available buffer size of the first IAB node, via the adaptation layer associated with the IAB network,
  wherein the first IAB node comprises a function of distributed unit for a base station and a function for a user equipment (UE),
  wherein the second node corresponds to an IAB node or a distributed unit of the base station, and
  wherein the third node corresponds to a donor central unit of the base station.

2. The first IAB node of claim 1, wherein the controller is further configured to receive, from the second node indicated by the identification information received from the third node, information indicating radio link recovery of the second node.

3. The first IAB node of claim 1, wherein the identification information indicating the second node which is to receive information on the available buffer size of the first IAB node indicates a next hop node to receive a packet transmitted from the first IAB node.

4. The first IAB node of claim 1, wherein the controller is further configured to:
receive, from the second node indicated by the identification information received from the third node, information indicating a radio link failure (RLF), and
initiate a connection re-establishment procedure in response to the information indicating the RLF.

5. A second node in a communication system, the second node comprising:
a transceiver; and
a controller configured to:
transmit, to a first integrated access and backhaul (IAB) node, information indicating to report the information on an available buffer size of the first IAB node, via an adaptation layer associated with an IAB network, and
receive, from the first IAB node, the information on the available buffer size of the first IAB node, via the adaptation layer associated with the IAB network,
wherein identification information indicating the second node is to receive information on an available buffer size of the first IAB node from the first IAB node is transmitted from a third node to the first IAB node,
wherein the first IAB node comprises a function of distributed unit for a base station and a function for a user equipment (UE),
wherein the second node corresponds to an IAB node or a distributed unit of the base station, and
wherein the third node corresponds to a donor central unit of a base station.

6. The second node of claim 5, wherein the controller is further configured to transmit, to the first IAB node, information indicating radio link recovery of the second node.

7. The second node of claim 5, wherein the identification information indicating the second node is to receive information on an available buffer size of the first IAB node from the first IAB node indicates a next hop node to receive a packet transmitted from the first IAB node.

8. The second node of claim 5,
wherein the controller is further configured to transmit, to the first IAB node, information indicating a radio link failure (RLF), and
wherein a connection re-establishment procedure is initiated by the first IAB node in response to the information indicating the RLF.

9. A third node in a communication system, the third node comprising:
a transceiver; and
a controller configured to:
generate identification information indicating a second node which is to receive information on an available buffer size of a first integrated access and backhaul (IAB) node from the first IAB node, and
transmit, to the first IAB node, the generated identification information indicating the second node is to receive the information on the available buffer size of the first IAB node,
wherein information indicating to report the information on the available buffer size of the first IAB node is transmitted from the second node to the first IAB node, via an adaptation layer associated with an IAB network, and
wherein the information on an available buffer size of the first IAB node is transmitted from the first IAB node to the second node indicated by the identification information generated by the third node, via the adaptation layer associated with the IAB network;
wherein the first IAB node comprises a function of distributed unit for a base station and a function for a user equipment (UE),
wherein the second node corresponds to an IAB node or a distributed unit of the base station, and
wherein the third node corresponds to a donor central unit of a base station.

* * * * *